(12) United States Patent
Liu et al.

(10) Patent No.: US 10,966,276 B2
(45) Date of Patent: Mar. 30, 2021

(54) SIGNAL TRANSMISSION METHOD FOR DISCONTINUOUS RECEPTION, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/475,993

(22) PCT Filed: Jan. 5, 2017

(86) PCT No.: PCT/CN2017/070331
§ 371 (c)(1),
(2) Date: Jul. 3, 2019

(87) PCT Pub. No.: WO2018/126419
PCT Pub. Date: Jul. 12, 2018

(65) Prior Publication Data
US 2019/0350040 A1 Nov. 14, 2019

(51) Int. Cl.
*H04W 76/28* (2018.01)
*H04W 76/27* (2018.01)
(Continued)

(52) U.S. Cl.
CPC ............ *H04W 76/28* (2018.02); *H04B 7/088* (2013.01); *H04W 52/0229* (2013.01);
(Continued)

(58) Field of Classification Search
CPC .... H04B 7/0617; H04B 7/0802; H04B 7/088; H04L 5/0048–0051; H04W 52/0216;
(Continued)

(56) References Cited

U.S. PATENT DOCUMENTS

2015/0078189 A1* 3/2015 Kwon .................. H04W 24/08
370/252
2017/0251518 A1* 8/2017 Agiwal ................ H04W 76/28

FOREIGN PATENT DOCUMENTS

| CN | 101610538 | 12/2009 |
|---|---|---|
| CN | 102378329 | 3/2012 |
| CN | 105191432 | 12/2015 |

OTHER PUBLICATIONS

Huawei et al., "UE power saving mechanism in High Frequency," 3GPP TSG-RAN2 WG2 Meeting #96, R2-167875, Nov. 2016, 2 pages.
(Continued)

*Primary Examiner* — Pao Sinkantarakorn
(74) *Attorney, Agent, or Firm* — Hodgson Russ LLP (57) ABSTRACT

A signal transmission method includes: determining, by a terminal device, at least one start time point for entering an activated state of radio resource control (RRC) active discontinuous reception (DRX); and receiving, by the terminal device at each of the at least one start time point, a first signal sent by a network device, the first signal being used by the terminal device to determine, from at least one downlink receiving beam, a target downlink receiving beam for receiving and decoding a downlink control channel sent by the network device.

17 Claims, 3 Drawing Sheets

200

A terminal device determining at least one start moment of entering an activated state of radio resource control (RRC) active discontinuous reception (DRX) — S210

The terminal device receiving a first signal sent by a network device at each of the at least one start moments, wherein the first signal is used for the terminal device to determine, from at least one downlink receiving beam, a target downlink receiving beam for receiving and decoding a downlink control channel sent by the network device — S220

(51) Int. Cl.
   *H04B 7/08*    (2006.01)
   *H04W 52/02*   (2009.01)
   *H04W 72/04*   (2009.01)
   *H04W 72/12*   (2009.01)

(52) U.S. Cl.
   CPC ..... *H04W 72/042* (2013.01); *H04W 72/1289* (2013.01); *H04W 76/27* (2018.02)

(58) Field of Classification Search
   CPC ........... H04W 72/042; H04W 72/1289; H04W 76/27; H04W 76/28
   See application file for complete search history.

(56) References Cited

OTHER PUBLICATIONS

Samsung, "NR Connected DRX Operation with Beamforming," 3GPP TSG-RAN WG2 Meeting #96, R2-168816, Nov. 2016, 5 pages.
EPO, Office Action for EP Application No. 17889654.4, dated Nov. 26, 2019.
WIPO, ISR for PCT/CN2017/070331, dated May 3, 2017.
Intellectual Property India, Examination Report for in Application No. 201917030678, dated Oct. 28, 2020.
European Patent Office, Communication for EP Application No. 17889654.4, dated Nov. 12, 2020.
Instituto Nacional de Propiedad Industrial (INAPI)—Chile, Examination Report for CL Application No. 201901851, dated Oct. 27, 2020.

\* cited by examiner

SIGNAL TRANSMISSION METHOD FOR DISCONTINUOUS RECEPTION, TERMINAL DEVICE AND NETWORK DEVICE

CROSS-REFERENCE TO RELATED APPLICATION

This application is a U.S. national phase application of International Application No. PCT/CN2017/070331, filed Jan. 5, 2017, the entire disclosure of which is incorporated herein by reference.

TECHNICAL FIELD

The present application relates to the field of communications, and more particularly, to a signal transmission method for discontinuous reception (abbreviated as "DRX"), a terminal device and a network device in the field of communications.

BACKGROUND

In order to reduce cost of state transition in the change of the service mode, an intermediate state, that is, the Connection State Discontinuous Reception (abbreviated as "active DRX") mechanism is introduced in the Long Term Evolution (abbreviated as "LTE") system. The active DRX mechanism allows the terminal device to periodically transition between a sleep state and an activated state while maintaining a Radio Resource Control (abbreviated as "RRC") connection. The active DRX mechanism divides the connection state of the terminal device into an activated state phase and a sleep state phase. By causing the terminal device to periodically enter the sleep phase and stop listening to the physical downlink control channel (abbreviated as "PDCCH"), the system resource configuration can be optimized. Moreover, since the RRC connection still exists in this state, the terminal device can transition to the activated state very quickly.

In a multi-beam scenario of 5 G, multiple downlink receiving beams can be trained through beamforming by the terminal device and the network device. Different downlink receiving beams may transmit signals on different time resources, but as a location of the terminal device changes, a direction of currently used downlink receiving beam may be unable to be used for signal transmission with the downlink transmit beam matched with the network device before the change.

In the existing DRX technology, the network device may configure a DRX cycle for the terminal device, and then send a downlink reference signal to the terminal device. The terminal device receives the downlink reference signal sent by the network device during an activated state of DRX and determines, according to the downlink reference, a target downlink receiving beam for receiving and decoding downlink control channel from at least one downlink receiving beam.

However, the downlink reference signal sent by the network device and the DRX of the terminal device have respective periods, and the terminal device may enter the activated state of DRX cycle between transmission timing of two adjacent reference signals, causing longer time for the terminal device to select the downlink receiving beam.

SUMMARY

According to a signal transmission method for DRX, a terminal device and a network device provided by embodiments of the application, time required by the terminal device to select downlink receiving beam may be reduced.

According to a first aspect of the present application, there is provided a signal transmission method for DRX. The transmission method includes:

determining, by a terminal device, at least one start time point for entering an activated state of radio resource control (RRC) connection state discontinuous reception (active DRX); and receiving, by the terminal device at each of the at least one start time point, a first signal sent by a network device, the first signal being used by the terminal device to determine, from at least one downlink receiving beam, a target downlink receiving beam for receiving and decoding a downlink control channel sent by the network device.

According to the signal transmission method for DRX provided by the embodiment of the present application, the terminal device may receive the first signal sent by the network device at the moment of entering the activated state of RRC active DRX, such that time needed for the terminal device to select downlink receiving beam can be reduced, enabling the terminal device to successfully receive and decode the downlink control channel during the activated state of the RRC active DRX.

It should be understood that the downlink receiving beam of the terminal device in the embodiment of the present application may also be a downlink receiving signal or a downlink channel. The embodiment of the present application is not limited thereto.

It should also be understood that the first signal sent by the network device is used by the terminal device to select a target downlink receiving signal from all downlink receiving beams, and the first signal may be, for example, a downlink reference signal, a PSS, an SSS, or other signals used for measurement. The embodiment of the present application is not limited thereto.

It should be further understood that, the terminal device may receive the first signal sent by the network device through measuring, by the terminal device, the first signal received by each downlink receiving beam among the at least one downlink receiving beam, and determining, according to the measurement result, a target downlink receiving beam for receiving and decoding a downlink control channel transmitted by the network device from the at least one downlink receiving beam.

Optionally, the at least one downlink receiving beam may be formed in advance by the terminal device and the network device through beamforming.

In a possible embodiment, the signal transmission method, prior to the determining, by a terminal device, at least one start time point for entering an activated state of RRC active DRX, further includes: determining, by the terminal device, a period of DRX cycle, the period of DRX cycle including a duration of the activated state and a duration of an inactivated state. The determining, by a terminal device, at least one start time point for entering an activated state of RRC active DRX, includes: determining, by the terminal device, a plurality of start time points according to the period of DRX cycle.

In a possible embodiment, a period of DRX cycle is an integer multiple of a transmission period of the first signal, and the period of DRX cycle includes a duration of the activated state and of an inactivated state.

It should be understood that each DRX cycle of the terminal device may include an activated state and an inactivated state, that is, each DRX cycle corresponds to a start time point when a terminal device enters the activated state. Therefore, the plurality of start time points may be determined according to the period of DRX cycle.

Optionally, the terminal device may determine the period of DRX cycle according to an indication of the network device, or may predetermine the period of DRX cycle with the network device, or may determine the period of DRX cycle based on a DRX pattern pre-configured by the network device. The embodiment of the present application is not limited thereto.

According to the signal transmission method for DRX provided by the embodiments of the present application, the period of the RRC active DRX of the terminal device is an integer multiple of transmission period of the first signal sent by the network device, so that the terminal device may receive the first signal at each start time point of entering the activated state of DRX, reducing the time for the terminal device to select the downlink receiving beam.

In a possible embodiment, the determining, by a terminal device, at least one start time point for entering an activated state of RRC active DRX, includes: receiving, by the terminal device, third indication information sent by the network device, the third indication information being indicative of a first start time point in the at least one start time point.

It should be understood that, the first start time point may include one or more start time points among the at least one start time point.

Optionally, the terminal device may determine the at least one start time point according to an indication of the network device, or may predetermine the at least one start time point with the network device, or may determine the at least one start time point based on a DRX pattern pre-configured by the network device. The embodiment of the present application is not limited thereto.

In a possible embodiment, a transmission period of the first signal is T, and the signal transmission method further includes: determining, by the terminal device, a plurality of sending time points according to the transmission period of the first signal; and receiving, by the terminal device at a first sending time point in the plurality of sending time points, the first signal sent by the network device, if the first sending time point is different from each of the at least one start time point.

Specifically, if the first sending time point among the plurality of sending time points is different from each of the at least one start time point, it indicates that the terminal device cannot receive first signal when entering the activated state of the RRC active DRX. Accordingly, the network device may additionally send a first signal to the terminal device at this moment. In other words, the terminal device may receive the first signal at each of the at least one start time point and the first sending time point.

It should be understood that the first sending time point may be any one or more sending time points among the plurality of sending time points.

It should also be understood that each transmission period of the first signal may correspond to a sending time point, so the terminal device may determine a plurality of sending time points according to the transmission period of the first signal.

Optionally, if a second sending time point among the plurality of sending time points is the same as a second start time point among the at least one start time point, it indicates that the second sending time point is just a start time point of a DRX cycle. Accordingly, the network device does not need to additionally send the first signal at the second start time point, and the terminal device may receive the first signal at the second sending time point according to the transmission period of the first signal.

It should be understood that the second sending time point may include one or more sending time points among the plurality of sending time points, and the second start time point may include one or more start time points among the plurality of start time points.

According to the signal transmission method for DRX provided by the embodiments of the present application, the terminal device may receive the first signal sent by the network device at the moment of entering the activated state of the RRC active DRX, reducing the time required for the terminal device during the activated state of RRC active DRX to select the downlink receiving beam.

According to a second aspect of the present application, there is provided a signal transmission method for DRX. The transmission method includes:

determining, by a network device, at least one start time point for a terminal device entering an activated state of RRC active DRX; and sending, by the network device at each of the at least one start time point, a first signal to the terminal device, the first signal being used by the terminal device to determine, from at least one downlink receiving beam, a target downlink receiving beam for receiving and decoding a downlink control channel sent by the network device.

According to the signal transmission method for DRX provided by the embodiment of the present application, the network device may send the first signal to the terminal device at the moment of the terminal device entering the activated state of RRC active DRX, such that time needed for the terminal device to select downlink receiving beam can be reduced, enabling the terminal device to successfully receive and decode the downlink control channel during the activated state of the RRC active DRX.

It should be understood that the downlink receiving beam of the terminal device in the embodiment of the present application may also be a downlink receiving signal or a downlink channel. The embodiment of the present application is not limited thereto.

It should also be understood that the first signal sent by the network device is used by the terminal device to select a target downlink receiving signal from all downlink receiving beams, and the first signal may be, for example, a downlink reference signal, a PSS, an SSS, or other signals used for measurement. The embodiment of the present application is not limited thereto.

Optionally, the first signal may be a measurement signal that is specifically sent by the network device for one or more terminal devices selecting the downlink receiving beam. The embodiment of the present application is not limited thereto.

Optionally, the at least one downlink receiving beam may be formed in advance by the terminal device and the network device through beamforming.

In a possible embodiment, the signal transmission method, prior to the determining, by a network device, at least one start time point for a terminal device entering an activated state of RRC active DRX, further includes: determining, by the network device, a period of DRX cycle, the period of DRX cycle comprising a duration of the activated state and a duration of an inactivated state. The determining, by a network device, at least one start time point for a terminal device entering an activated state of RRC active DRX, includes: determining, by the network device, a plurality of start time points according to the period of DRX cycle.

It should be understood that each DRX cycle of the terminal device may include an activated state and an inactivated state, that is, each DRX cycle corresponds to a start time point when a terminal device enters the activated state. Therefore, the plurality of start time points may be determined by the network device according to the period of DRX cycle.

Optionally, the network device may predetermine the period of DRX cycle with the terminal device, or may determine the period of DRX cycle based on a pre-configured DRX pattern, or may determine by itself the period of DRX cycle and notify the terminal device of the same through indication information. The embodiment of the present application is not limited thereto.

In a possible embodiment, a period of DRX cycle is an integer multiple of a transmission period of the first signal, and the period of DRX cycle comprises a duration of the activated state and of an inactivated state.

In a possible embodiment, the signal transmission method, prior to the sending, by the network device at each of the at least one start time point, a first signal to the terminal device, further includes: sending, by the network device, third indication information to terminal device, the third indication information being indicative of a first start time point in the at least one start time point.

It should be understood that, the first start time point may include one or more start time points among the at least one start time point.

Optionally, the network device may predetermine the at least one start time point with the terminal device, or may determine the at least one start time point based on a pre-configured DRX pattern. The embodiment of the present application is not limited thereto.

In a possible embodiment, a transmission period of the first signal is T, and the signal transmission method further includes: determining, by the network device, a plurality of sending time points according to the transmission period of the first signal; and sending, by the network device at a first sending time point in the plurality of sending time points, the first signal to the terminal device, if the first sending time point is different from each of the at least one start time point.

In other words, if the first sending time point among the plurality of sending time points is different from each of the at least one start time point, it indicates that the terminal device cannot receive first signal when entering the activated state of the RRC active DRX. Thus, the network device may additionally send a first signal to the terminal device at this moment. Accordingly, the terminal device may receive the first signal at each of the at least one start time point and the first sending time point.

It should be understood that the first sending time point may be any one or more sending time points among the plurality of sending time points.

It should also be understood that each transmission period of the first signal may correspond to a sending time point, so the terminal device may determine a plurality of sending time points according to the transmission period of the first signal.

Optionally, if a second sending time point among the plurality of sending time points is the same as a second start time point among the at least one start time point, it indicates that the second sending time point is just a start time point of a DRX cycle. Accordingly, the network device does not need to additionally send the first signal at the second start time point, and the terminal device may receive the first signal at the second sending time point according to the transmission period of the first signal.

It should be understood that the second sending time point may include one or more sending time points among the plurality of sending time points, and the second start time point may include one or more start time points among the plurality of start time points.

According to the signal transmission method for DRX provided by the embodiments of the present application, the network device may send the first signal to the terminal device based on the transmission period of the first signal. If the time point when the terminal device enters the activated state of the RRC active DRX does not overlap with the send time point of the first signal sent by the network device, the network device may additionally send the first signal to the terminal device, enabling the terminal device to receive the first signal at the start time point of entering the RRC active DRX.

In addition, the network device configures the period of DRX cycle of the terminal device to be an integer multiple of the transmission period of the first signal, and the start time point of any terminal device entering the activated state of RRC active DRX is aligned with the sending time point of any one of the first signal. In this way, as long as the network device sends the first signal according to the original transmission period of the first signal, the terminal device is able to receive the first signal at the start time point of entering the activated state of RRC active DRX.

According to a third aspect of the present application, there is provided a terminal device, configured to perform the signal transmission method according to the first aspect and any possible embodiments thereof as described above. Specifically, the terminal device includes units configured to perform the signal transmission method according to the first aspect and any possible embodiments thereof as described above.

According to a fourth aspect of the present application, there is provided a network device, configured to perform the signal transmission method according to the second aspect and any possible embodiments thereof as described above. Specifically, the network device includes units configured to perform the signal transmission method according to the first aspect and any possible embodiments thereof as described above.

According to a fifth aspect of the present application, there is provided a terminal device including a processor and a transceiver, and the processor is configured to implement, based on the transceiver, the signal transmission method according to the first aspect and any possible embodiments thereof.

According to a sixth aspect of the present application, there is provided a network device including a processor and a transceiver, and the processor is configured to implement, based on the transceiver, the signal transmission method according to the second aspect and any possible embodiments thereof.

According to a seventh aspect of the present application, there is provided a computer readable medium configured to store a computer program, and the computer program includes instructions for implementing the signal transmission method according to the first aspect and any possible embodiments thereof.

According to an eighth aspect of the present application, there is provided a computer readable medium configured to store a computer program, and the computer program includes instructions for implementing the signal transmission method according to the second aspect and any possible embodiments thereof.

DETAILED DESCRIPTION

The technical solutions in the embodiments of the present application will be described below with reference to the accompanying drawings.

It should be understood that the technical solutions according to the embodiments of the present application may be applied to various communication systems, for example, Global System of Mobile communication (abbreviated as "GSM") system, Code Division Multiple Access (abbreviated as "CDMA") system, Wideband Code Division Multiple Access (abbreviated as "WCDMA") system, General Packet Radio Service (abbreviated as "GPRS"), Long Term Evolution (abbreviated as "LTE") system, LTE Frequency Division Duplex (abbreviated as "FDD") system, LTE Time Division Duplex (abbreviated as "TDD") system, Universal Mobile Telecommunication System (abbreviated as "UMTS"), Worldwide Interoperability for Microwave Access (abbreviated as "WiMAX"), future evolved Public Land Mobile Network (abbreviated as "PLMN"), future 5 G system and the like.

Optionally, the 5 G system or network may also be referred to as New Radio (abbreviated as "NR") system or network.

Figure 1:
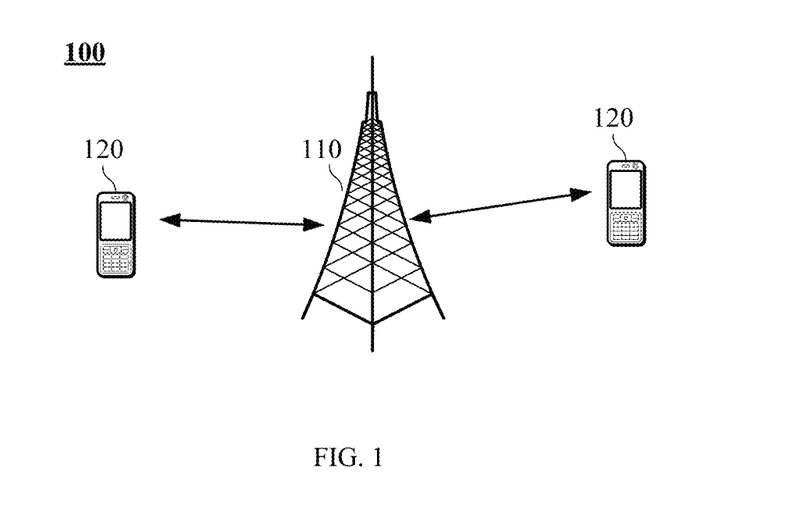
FIG. 1 is a schematic structural diagram illustrating a wireless communication system to which an embodiment of the present application is applied.

FIG. 1 shows a wireless communication system 100 to which an embodiment of the present application is applied. The wireless communication system 100 may include at least one network device 110. Network device 110 may be a device that communicates with a terminal device. Each network device 110 may provide communication coverage for a particular geographic area and may communicate with terminal devices (e.g., UEs) located within the coverage area. The network device 110 may be a Base Transceiver Station (abbreviated as "BTS") in the GSM or CDMA system, or a NodeB (abbreviated as "NB") in the WCDMA system, or an Evolutional Node B (abbreviated as "eNB" or "eNodeB") in the LTE system, or a wireless controller in the Cloud Radio Access Network (abbreviated as "CRAN"). Optionally, the network device may be a relay station, an access point, an in-vehicle device, a wearable device, a network side device in the future 5 G network, or a network device in the future evolved PLMN.

The wireless communication system 100 further includes a plurality of terminal devices 120 located within the coverage of the network device 110. The terminal device 120 may be mobile or fixed. The terminal device 120 may refer to an access terminal, a User Equipment (abbreviated as "UE"), a subscriber unit, a subscriber station, a mobile station, a mobile unit, a remote station, a remote terminal, a mobile device, a user terminal, a terminal, a wireless communication device, a user agent or a user device. Optionally, the access terminal may be a cellular phone, a cordless phone, a Session Initiation Protocol (abbreviated as "SIP") phone, a Wireless Local Loop (abbreviated as "WLL") station, Personal Digital Assistant (abbreviated as "PDA"), a handheld device or a computing device with wireless communication capabilities, or other processing devices connected to a wireless modem, such as an in-vehicle device or a wearable device, a terminal device in the future 5 G network, a terminal device in the future evolved PLMN, or the like.

FIG. 1 exemplarily shows one network device and two terminal devices. Optionally, the wireless communication system 100 may include a plurality of network devices and may include other numbers of terminal devices within the coverage of each network device. Embodiments of the application are not limited thereto.

Optionally, the wireless communication system 100 may further include other network entities, such as a network controller, a mobility management entity, and the like. Embodiments of the application are not limited thereto.

The following is a description of the discontinuous reception (abbreviated as "DRX") technology involved in the embodiment of the present application.

Packet-based data streams are usually bursty. When there is no data transmission, the power consumption may be reduced by turning off the receiving circuitry of the terminal device, thereby increasing battery life. This is the origin of DRX, that is, DRX technology refers to stopping monitoring the PDCCH channel for a period of time. There are two types of DRX, one is DRX in RRC_IDLE. As the name implies, it is discontinuous reception when the terminal device is in the idle state (IDLE). As in the IDLE state, there is no Radio Resource Control (abbreviated as "RRC") connection and proprietary resource for the user, so it mainly needs to monitor the call channel and the broadcast channel. As long as a fixed period is defined in advance, the purpose of discontinuous reception may be achieved. However, if the terminal device wants to listen to the user data channel, it must firstly enters the connection state (CONNECTED) from the IDLE state. The other type of DRX is DRX in RRC_CONNECTED, that is, the discontinuous reception when the terminal device is in the RRC connection state. The system resource configuration may be optimized by causing the terminal device to periodically enter the sleep period and stop monitoring the PDCCH. More importantly, power may be saved without having to let the terminal device enter the IDLE state to achieve this purpose. For example, some non-real-time applications, such as web browsing and instant messaging, always exist for a period of time, the mobile phone does not need to continuously listening to downlink data and performing related processing, and then DRX technology may be applied to such a situation.

DRX in RRC_CONNECTED is also known as connection state DRX (active DRX). The active DRX mechanism allows the terminal device to periodically transition between a sleep state and an activated state while maintaining an RRC connection. The active DRX mechanism divides the connected state of the terminal device into an activated state phase and a sleep state phase. When the terminal device is in the activated state, the receiving antenna of the terminal device is turned on, so that the terminal device may receive the downlink data packet, and the power consumption of the terminal device is high. When the terminal device is in the sleep state, the receiving antenna of the terminal device is turned off, the terminal device cannot receive the downlink data packet, and the terminal device is in the power saving mode, but the context of the RRC connection remains.

It should be understood that, according to different service scenarios, the network side may allocate a short DRX cycle or a long DRX cycle to the terminal device. For example, when performing Voice over Internet Protocol (VoIP) service, the short DRX cycle may be configured. For another example, the long DRX cycle may be configured during a long silent period of a voice call.

The judgment condition that the terminal device enters the short DRX cycle is that the System Frame Number (SFN) and the subframe Number need to satisfy:

[(SFN*10)+subframeNumber]modulo(shortDRX-Cycle)=(drxStartOffset)modulo(shortDRX-cycle)

The judgment condition that the terminal device enters the long DRX cycle is that the frame number SFN and the subframe Number need to satisfy:

[(SFN*10)+subframeNumber]modulo(longDRX-Cycle)=drxStartOffset

Herein, the meaning of parameter "drxStartOffset" is from which subframe the DRX cycle starts. For example, the cycle is 10 subframes, then the range of drxStartOffset is 0-9. For another example, the cycle is 20 subframes, then the range of drxStartOffset is 0-19.

According to the signal transmission method, the terminal device, and the network device for discontinuous reception provided by the embodiments of the present application, the time required for the terminal device to select the downlink receiving beam during the activated state of the RRC active DRX may be reduced, enabling the terminal device to successfully receive and decode the downlink control channel during the activated state of the RRC active DRX.

Figure 2:
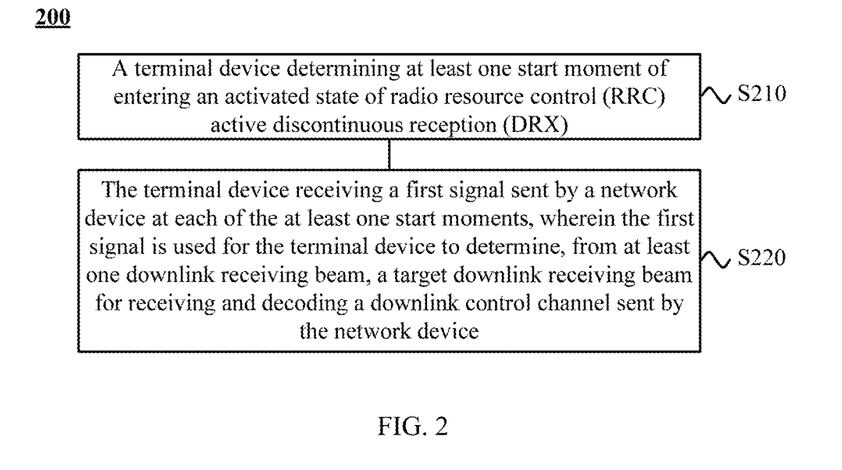
FIG. 2 is a schematic flowchart illustrating a signal transmission method for DRX according to an embodiment of the present application.

FIG. 2 is a schematic flowchart illustrating a signal transmission method 200 for discontinuous reception provided by an embodiment of the present application, and the signal transmission method may be performed by, for example, a terminal device.

In step S210, the terminal device determines at least one start time point for entering an activated state of radio resource control (RRC) connection state discontinuous reception (active DRX).

In step S220, the terminal device receives, at each of the at least one start time point, a first signal sent by a network device, the first signal being used by the terminal device to determine, from at least one downlink receiving beam, a target downlink receiving beam for receiving and decoding a downlink control channel sent by the network device.

According to the signal transmission method for DRX provided by the embodiment of the present application, the terminal device may receive the first signal sent by the network device at the moment of entering the activated state of RRC active DRX, such that time needed for the terminal device to select downlink receiving beam can be reduced, enabling the terminal device to successfully receive and decode the downlink control channel during the activated state of the RRC active DRX.

It should be understood that the downlink receiving beam of the terminal device in the embodiment of the present application may also be a downlink receiving signal or a downlink channel. The embodiment of the present application is not limited thereto.

It should also be understood that the first signal sent by the network device is used by the terminal device to select a target downlink receiving signal from all downlink receiving beams, and the first signal may be, for example, a downlink reference signal, a Primary Synchronization Signal (PSS), a Secondary Synchronization Signal (PSS), or other signals used for measurement. The embodiment of the present application is not limited thereto.

Optionally, the first signal may be a measurement signal that is specifically sent by the network device for one or more terminal devices selecting the downlink receiving beam. The embodiment of the present application is not limited thereto.

It should be further understood that, the terminal device may receive the first signal sent by the network device through measuring, by the terminal device, the first signal received by each downlink receiving beam among the at least one downlink receiving beam, and determining, according to the measurement result, a target downlink receiving beam for receiving and decoding a downlink control channel transmitted by the network device from the at least one downlink receiving beam.

Optionally, the at least one downlink receiving beam may be formed in advance by the terminal device and the network device through beamforming.

Optionally, before S210, the terminal device may determine a period of DRX cycle, the period of DRX cycle including a duration of the activated state and a duration of an inactivated state. The terminal device may determine the at least one start time point for entering an activated state of RRC active DRX by determining a plurality of start time points according to the period of DRX cycle.

It should be understood that each DRX cycle of the terminal device may include the activated state and the inactivated state, that is, each DRX cycle corresponds to a start time point when the terminal device enters the activated state. Therefore, the plurality of start time points may be determined according to the period of DRX cycle.

Optionally, the terminal device may determine the period of DRX cycle according to an indication of the network device, or may predetermine the period of DRX cycle with the network device, or may determine the period of DRX cycle based on a DRX pattern pre-configured by the network device. The embodiment of the present application is not limited thereto.

Optionally, the period of the RRC active DRX cycle of the terminal device may be an integer multiple of transmission period of the first signal sent by the network device, so that the terminal device may receive the first signal at the start time point of the activated state of each DRX cycle, reducing the time for the terminal device selecting the downlink receive beam.

Optionally, in S210, the determining, by the terminal device, at least one start time point for entering an activated state of RRC active DRX, may include: receiving, by the terminal device, third indication information sent by the network device, the third indication information being indicative of a first start time point in the at least one start time point.

It should be understood that the first start time point may include one or more start time points among the at least one start time point.

Optionally, the terminal device may determine the at least one start time point according to an indication of the network device, or may predetermine the at least one start time point with the network device, or may determine the at least one start time point based on a DRX pattern pre-configured by the network device. The embodiment of the present application is not limited thereto.

Optionally, if the transmission period of the first signal is T, the terminal device may determine a plurality of sending time points according to the transmission period of the first signal; and receive, at a first sending time point in the plurality of sending time points, the first signal sent by the network device, if the first sending time point is different from each of the at least one start time point.

In other words, if the first sending time point among the plurality of sending time points is different from each of the at least one start time point, it indicates that the terminal device cannot receive first signal when entering the activated state of the RRC active DRX. Accordingly, the network device may additionally send a first signal to the terminal device at this moment. That is, the terminal device may receive the first signal at each of the at least one start time point and the first sending time point.

It should be understood that the first sending time point may be any one or more sending time points among the plurality of sending time points.

It should also be understood that each transmission period of the first signal may correspond to a sending time point, so the terminal device may determine a plurality of sending time points according to the transmission period of the first signal.

Optionally, if a second sending time point among the plurality of sending time points is the same as a second start time point among the at least one start time point, it indicates that the second sending time point is just a start time point of a DRX cycle. Accordingly, the network device does not need to additionally send the first signal at the second start time point, and the terminal device may receive the first signal at the second sending time point according to the transmission period of the first signal.

It should be understood that the second sending time point may include one or more sending time points among the plurality of sending time points, and the second start time point may include one or more start time points among the plurality of start time points.

Optionally, if the period of DRX cycle of the terminal device is an integer multiple of the transmission period of the first signal, and the second sending time point among the plurality of sending time points is the same as the second start time point among the at least one start time points, it indicates that the terminal device may receive the first signal sent by the network device at each start time point of entering the activated state of the RRC active DRX. In other words, the terminal device may receive the first signal based on the plurality of sending time points corresponding to the transmission period of the first signal.

According to the signal transmission method for DRX provided by the embodiments of the present application, the terminal device may receive the first signal sent by the network device at the moment of entering the activated state of the RRC active DRX, reducing the time required for the terminal device during the activated state of RRC active DRX to select the downlink receiving beam.

Figure 3:
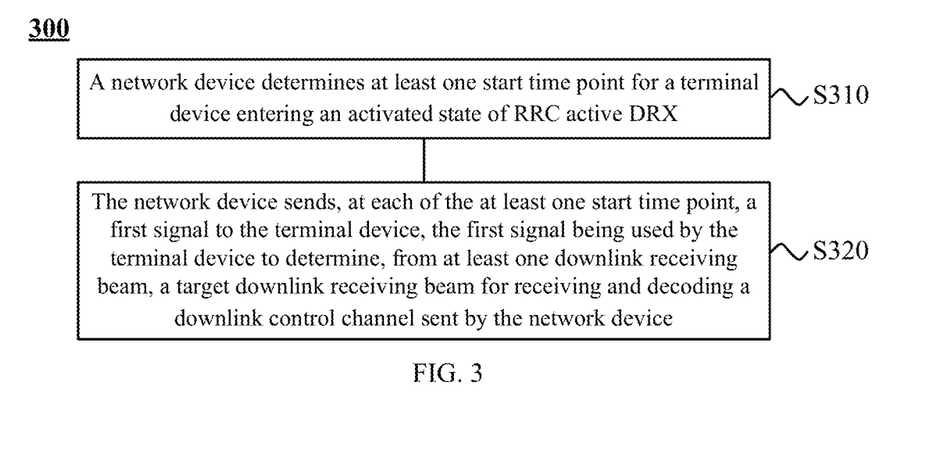
FIG. 3 is a schematic flowchart illustrating a signal transmission method for DRX according to another embodiment of the present application.

FIG. 3 is a schematic flowchart illustrating the data transmission method 300 for discontinuous reception according to another embodiment of the present application.

The signal transmission method may be performed, for example, by a network device.

In step S310, the network device determines at least one start time point for a terminal device entering an activated state of RRC active DRX.

In step S320, the network device sends, at each of the at least one start time point, a first signal to the terminal device, the first signal being used by the terminal device to determine, from at least one downlink receiving beam, a target downlink receiving beam for receiving and decoding a downlink control channel sent by the network device.

According to the signal transmission method for DRX provided by the embodiment of the present application, the network device may send the first signal to the terminal device at the moment of the terminal device entering the activated state of RRC active DRX, such that time needed for the terminal device to select downlink receiving beam can be reduced, enabling the terminal device to successfully receive and decode the downlink control channel during the activated state of the RRC active DRX.

It should be understood that the downlink receiving beam of the terminal device in the embodiment of the present application may also be a downlink receiving signal or a downlink channel. The embodiment of the present application is not limited thereto.

It should also be understood that the first signal sent by the network device is used by the terminal device to select a target downlink receiving signal from all downlink receiving beams, and the first signal may be, for example, a downlink reference signal, a PSS, an SSS, or other signals used for measurement. The embodiment of the present application is not limited thereto.

Optionally, the first signal may be a measurement signal that is specifically sent by the network device for one or more terminal devices selecting the downlink receiving beam. The embodiment of the present application is not limited thereto.

Optionally, the at least one downlink receiving beam may be formed in advance by the terminal device and the network device through beamforming.

Optionally, before S310, the network device may determine a period of DRX cycle, the period of DRX cycle comprising a duration of the activated state and a duration of an inactivated state. The determining, by the network device, at least one start time point for a terminal device entering an activated state of RRC active DRX, may include determining, by the network device, a plurality of start time points according to the period of DRX cycle.

It should be understood that each DRX cycle of the terminal device may include the activated state and the inactivated state, that is, each DRX cycle corresponds to a start time point when a terminal device enters the activated state. Therefore, the plurality of start time points may be determined by the network device according to the period of DRX cycle.

Optionally, the network device may predetermine the period of DRX cycle with the terminal device, or may determine the period of DRX cycle based on a pre-configured DRX pattern, or may determine by itself the period of DRX cycle and notify the terminal device of the same through indication information. The embodiment of the present application is not limited thereto.

Optionally, the period of the RRC active DRX cycle of the terminal device, which is configured by the network device, may be an integer multiple of transmission period of the first signal sent by the network device, so that the terminal device may receive the first signal at the start time point of the activated state of each DRX cycle, reducing the time for the terminal device selecting the downlink receive beam.

Optionally, before S320, the network device may send third indication information to terminal device, the third indication information being indicative of a first start time point in the at least one start time point t.

It should be understood that the first start time point may include one or more start time points among the at least one start time point.

Optionally, the network device may predetermine the at least one start time point with the terminal device, or may determine the at least one start time point based on a pre-configured DRX pattern. The embodiment of the present application is not limited thereto.

Optionally, if a transmission period of the first signal is T, the network device may determine a plurality of sending time points according to the transmission period of the first signal; and send, at a first sending time point in the plurality of sending time points, the first signal to the terminal device, if the first sending time point is different from each of the at least one start time point.

In other words, if the first sending time point among the plurality of sending time points is different from each of the at least one start time point, it indicates that the terminal device cannot receive first signal when entering the activated state of the RRC active DRX. Thus, the network device may additionally send a first signal to the terminal device at this moment. Accordingly, the terminal device may receive the first signal at each of the at least one start time point and the first sending time point.

It should be understood that the first sending time point may be any one or more sending time points among the plurality of sending time points.

It should be understood that each transmission period of the first signal may correspond to a sending time point, so the terminal device may determine a plurality of sending time points according to the transmission period of the first signal.

Optionally, if a second sending time point among the plurality of sending time points is the same as a second start time point among the at least one start time point, it indicates that the second sending time point is just a start time point of a DRX cycle. Accordingly, the network device does not need to additionally send the first signal at the second start time point, and the terminal device may receive the first signal at the second sending time point according to the transmission period of the first signal.

It should be understood that the second sending time point may include one or more sending time points among the plurality of sending time points, and the second start time point may include one or more start time points among the plurality of start time points.

Optionally, if the network device configures the period of DRX cycle of the terminal device as an integer multiple of the transmission period of the first signal, and the second sending time point among the plurality of sending time points is the same as the second start time point among the plurality of the at least one start time points, it indicates that the network device sends the first signal to the terminal device every time the terminal device enters the activated state of the RRC active DRX, that is, the terminal device may receive the first signal based on the plurality of sending time points corresponding to the transmission period of the first signal.

According to the signal transmission method for DRX provided by the embodiments of the present application, the network device may send the first signal to the terminal device based on the transmission period of the first signal. If the time point when the terminal device enters the activated state of the RRC active DRX does not overlap with the send time point of the first signal sent by the network device, the network device may additionally send the first signal to the terminal device, enabling the terminal device to receive the first signal at the start time point of entering the RRC active DRX.

In addition, the network device configures the period of DRX cycle of the terminal device to be an integer multiple of the transmission period of the first signal, and the start time point of any terminal device entering the activated state of RRC active DRX is aligned with the sending time point of any one of the first signal. In this way, as long as the network device sends the first signal according to the original transmission period of the first signal, the terminal device is able to receive the first signal at the start time point of entering the activated state of RRC active DRX.

The signal transmission method for discontinuous reception according to the embodiments of the present application is described in detail above with reference to FIG. 1 to FIG. 3. The terminal device and the network device according to embodiments of the present application will be described in detail below with reference to FIG. 4 to FIG. 7.

Figure 4:
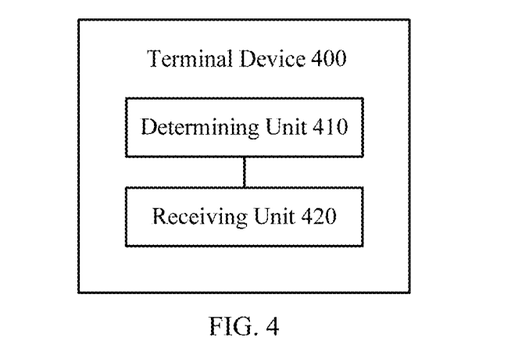
FIG. 4 is a schematic block diagram illustrating a terminal device according to an embodiment of the present application.

FIG. 4 shows a terminal device 400 according to an embodiment of the present application. The terminal device 400 includes a determining unit 410 and a receiving unit 420.

The determining unit 410 is configured to determine at least one start time point for entering an activated state of radio resource control (RRC) active discontinuous reception (DRX).

The receiving unit 420 is configured to receive, at each of the at least one start time point determined by the determining unit 410, a first signal sent by a network device, the first signal being used by the terminal device to determine, from at least one downlink receiving beam, a target downlink receiving beam for receiving and decoding a downlink control channel sent by the network device.

Optionally, the determining unit is further configured to, prior to determining the at least one start time point for entering the activated state of RRC active DRX, determine a period of DRX cycle, the period of DRX cycle including a duration of the activated state and a duration of an inactivated state; and determine a plurality of start time points according to the period of DRX cycle.

Optionally, the period of DRX cycle is an integer multiple of a transmission period of the first signal, and the period of DRX cycle includes a duration of the activated state and of an inactivated state.

Optionally, the determining unit is specifically configured to receive third indication information sent by the network device, the third indication information being indicative of a first start time point in the at least one start time point.

Optionally, a transmission period of the first signal is T, the determining unit is further configured to determine a plurality of sending time points according to the transmission period of the first signal; the receiving unit is further configured to receive, at a first sending time point in the plurality of sending time points, the first signal sent by the network device, if the first sending time point is different from each of the at least one start time point.

Optionally, the first signal may be a downlink reference signal or a downlink synchronization signal.

According to the signal transmission method for DRX provided by the embodiment of the present application, the terminal device may receive the first signal sent by the network device at the moment of entering the activated state of RRC active DRX, such that time needed for the terminal device to select downlink receiving beam can be reduced, enabling the terminal device to successfully receive and decode the downlink control channel during the activated state of the RRC active DRX.

In an optional example, those skilled in the art may understand that the terminal device 400 may be specifically the terminal device in the foregoing embodiment 200, and the terminal device 400 may be used to perform various processes and/or steps corresponding to the terminal device in the foregoing method embodiment 200, which are not repeated here in order to avoid repetition.

Figure 5:
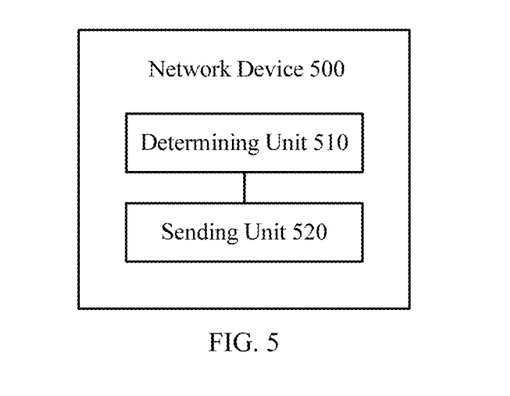
FIG. 5 is a schematic block diagram illustrating a network device according to an embodiment of the present application.

FIG. 5 shows a network device 500 according to an embodiment of the present application. The network device 500 includes a determining unit 510 and a sending unit 520.

The determining unit 510 is configured to determine at least one start time point for a terminal device entering an activated state of radio resource control (RRC) active discontinuous reception (DRX).

The sending unit 520 is configured to send, at each of the at least one start time point determined by the determining unit 510, a first signal to the terminal device, the first signal being used by the terminal device to determine, from at least one downlink receiving beam, a target downlink receiving beam for receiving and decoding a downlink control channel sent by the network device.

Optionally, the determining unit is specifically configured to, prior to determining the at least one start time point for the terminal device entering the activated state of RRC active DRX, determine a period of DRX cycle, the period of DRX cycle including a duration of the activated state and a duration of an inactivated state; and determine a plurality of start time points according to the period of DRX cycle.

Optionally, the period of DRX cycle is an integer multiple of a transmission period of the first signal, and the period of DRX cycle comprises a duration of the activated state and of an inactivated state.

Optionally, the sending unit is configured to, prior to sending the first signal to the terminal device at each of the at least one start time point, send third indication information to terminal device, the third indication information being indicative of a first start time point in the at least one start time point.

Optionally, a transmission period of the first signal is T, the determining unit is further configured to determine a plurality of sending time points according to the transmission period of the first signal; the sending unit is further configured to send, at a first sending time point in the plurality of sending time points, the first signal to the terminal device, if the first sending time point is different from each of the at least one start time point.

Optionally, the first signal may be a downlink reference signal or a downlink synchronization signal.

According to the signal transmission method for DRX provided by the embodiment of the present application, the network device may send the first signal to the terminal device at the moment of the terminal device entering the activated state of RRC active DRX, such that time needed for the terminal device to select downlink receiving beam can be reduced, enabling the terminal device to successfully receive and decode the downlink control channel during the activated state of the RRC active DRX.

In an optional example, those skilled in the art may understand that the network device 500 may be specifically the network device in the foregoing embodiment 300, and the network device 500 may be used to perform various processes and/or steps corresponding to the network device in the foregoing method embodiment 300, which are not repeated here in order to avoid repetition.

It should be understood that the terminal device 400 and the network device 500 herein may be embodied in the form of functional units. The term "unit" herein may refer to an Application Specific Integrated Circuit (ASIC), an electronic circuit, a processor for executing one or more software or firmware programs (e.g., a shared processor, a proprietary processor, a processor set or the like), as well as memory, merged logic circuit, and/or other suitable components that support the described functionality.

Figure 6:
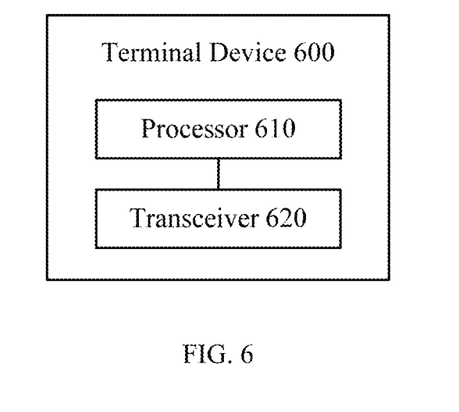
FIG. 6 is a schematic block diagram illustrating a terminal device according to another embodiment of the present disclosure.

FIG. 6 shows a schematic block diagram illustrating a terminal device 600 according to an embodiment of the present application. As shown in FIG. 6, the terminal device 600 includes a processor 610 and a transceiver 620.

The processor 610 is configured to determine at least one start time point for entering an activated state of radio resource control (RRC) active discontinuous reception (DRX).

The transceiver 620 is configured to receive, at each of the at least one start time point determined by the processor 610, a first signal sent by a network device, the first signal being used by the terminal device to determine, from at least one downlink receiving beam, a target downlink receiving beam for receiving and decoding a downlink control channel sent by the network device.

Optionally, the terminal device 600 may further include a memory, which may include a read only memory and a random access memory, and provide instructions and data to the processor. A portion of the memory may also include a non-volatile random access memory. For example, the memory may also store information of the device type. The processor 610 may be configured to execute instructions stored in a memory, and when the processor executes the instructions, the processor may perform various steps corresponding to the terminal device in the above method embodiments.

Figure 7:
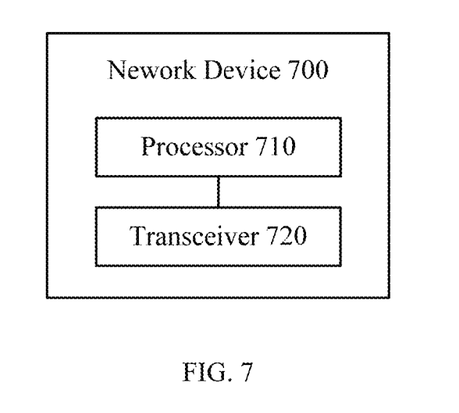
FIG. 7 is a schematic block diagram illustrating a network device according to another embodiment of the present application.

FIG. 7 shows a schematic block diagram illustrating a network device 700 according to an embodiment of the present application. As shown in FIG. 7, the network device 700 includes a processor 710 and a transceiver 720.

The processor 710 is configured to determine at least one start time point for a terminal device entering an activated state of radio resource control (RRC) active discontinuous reception (DRX).

The transceiver 720 is configured to send, at each of the at least one start time point determined by the processor 710, a first signal to the terminal device, the first signal being used by the terminal device to determine, from at least one downlink receiving beam, a target downlink receiving beam for receiving and decoding a downlink control channel sent by the network device.

Optionally, network device 700 may also include a memory, which may include read only memory and random access memory, and provides instructions and data to the processor. A portion of the memory may also include a non-volatile random access memory. For example, the memory may also store information of the device type. The processor 710 may be configured to execute instructions stored in a memory, and when the processor executes the instructions, the processor may perform various steps corresponding to the network device in the above method embodiments.

It should be understood that, in the embodiments of the present application, the processor may be a central processing unit (CPU), and the processor may also be general-purpose processor, digital signal processor (DSP), application specific integrated circuits (ASIC), Field Programmable Gate Array (FPGA) or other programmable logic device, discrete gate or transistor logic device, discrete hardware components, and the like. The general purpose processor may be a microprocessor or the processor or any conventional processor or the like.

In the implementation process, each step of the above method may be completed by an integrated logic circuit of hardware in a processor or an instruction in a form of software. The steps of the method disclosed in the embodiments of the present application may be directly implemented as a hardware processor, or may be performed by a combination of hardware and software modules in the processor. The software module may be located in a conventional storage medium such as random access memory, flash memory, read only memory, programmable read only memory or electrically erasable programmable memory, registers, and the like. The storage medium is located in a memory, and the processor executes instructions in the memory, in combination with hardware to perform the steps of the above method. To avoid repetition, it will not be described in detail here.

It should be understood that the term "and/or" herein is merely an association relationship describing an associated object, indicating that there may be three relationships. For example, A and/or B may indicate three cases: A or B exists separately, or A and B exist simultaneously. In addition, the character "/" in this disclosure generally indicates that the contextual object is an "or" relationship.

It should be understood that, in the various embodiments of the present application, the size of the sequence numbers of the foregoing processes does not mean the order of execution sequence, and the order of execution of each process should be determined by its function and internal logic, and should not be applied to the embodiment of the present application. The implementation process constitutes any limitation.

Those of ordinary skill in the art will appreciate that the elements and algorithm steps of the various examples described in connection with the embodiments disclosed herein may be implemented in electronic hardware or a combination of computer software and electronic hardware. Whether these functions are performed in hardware or software depends on the specific application and design constraints of the solution. A person skilled in the art may use different methods to implement the described functions for each particular application, but such implementation should not be considered to be beyond the scope of the present application.

A person skilled in the art may clearly understand that for the convenience and brevity of the description, the specific working process of the system, the device and the unit described above may refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or May be integrated into another system, or some features may be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the objectives of the embodiments of the present application.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, which is essential or contributes to the prior art, or a part of the technical solution, may be embodied in the form of a software product, which is stored in a storage medium, including The instructions are used to cause a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like.

The foregoing is only a specific embodiment of the present application, but the scope of protection of the present application is not limited thereto, and any person skilled in the art may easily think of changes or substitutions within the technical scope disclosed in the present application. It should be covered by the scope of protection of this application. Therefore, the scope of protection of the present application should be determined by the scope of the claims.

What is claimed is:

1. A signal transmission method for discontinuous reception, comprising:
    determining, by a terminal device, at least one start time point for entering an activated state of radio resource control (RRC) active discontinuous reception (DRX);
    determining, by the terminal device, a plurality of sending time points according to a transmission period of a first signal sent by a network device;
    receiving, by the terminal device in response to determining that a first sending time point in the plurality of sending time points is different from each of the at least one start time point, the first signal at the at least one start time point additionally sent by the network device regardless of the transmission period; and
    receiving, by the terminal device in response to determining that a second sending time point in the plurality of sending time points is same as a second start time point among the at least one start time point, the first signal at the second sending time point according to the transmission period of the first signal, the first signal being used by the terminal device to determine, from at least one downlink receiving beam, a target downlink receiving beam for receiving and decoding a downlink control channel sent by the network device.

2. The signal transmission method according to claim 1, wherein the signal transmission method, prior to the determining, by a terminal device, at least one start time point for entering an activated state of RRC active DRX, further comprises:

determining, by the terminal device, a period of DRX cycle, the period of DRX cycle comprising a duration of the activated state and a duration of an inactivated state;

the determining, by a terminal device, at least one start time point for entering an activated state of RRC active DRX, comprises:

determining, by the terminal device, a plurality of start time points according to the DRX cycle.

3. The signal transmission method according to claim 2, wherein the period of DRX cycle is determined by the terminal device according to an indication of the network device, or predetermined by the terminal device based on negotiation with the network device, or determined by the terminal device based on a DRX pattern pre-configured by the network device.

4. The signal transmission method according to claim 1, wherein a period of DRX cycle is an integer multiple of a transmission period of the first signal, and the period of DRX cycle comprises a duration of the activated state and of an inactivated state.

5. The signal transmission method according to claim 1, wherein the determining, by a terminal device, at least one start time point for entering an activated state of RRC active DRX, comprises:

receiving, by the terminal device, third indication information sent by the network device, the third indication information being indicative of a first start time point in the at least one start time point.

6. The signal transmission method according to claim 5, wherein the first start time point comprises one or more start time points of the at least one start time point.

7. The signal transmission method according to claim 1, wherein the first signal comprises a downlink reference signal or a downlink synchronization signal.

8. The signal transmission method according to claim 1, further comprising:

measuring, by the terminal device, the first signal received through each downlink receiving beam of the at least one downlink receiving beam; and determining, according to a result of the measuring, the target downlink receiving beam for receiving and decoding the downlink control channel sent by the network device from the at least one downlink receiving beam.

9. The signal transmission method according to claim 1, wherein the at least one downlink receiving beam is formed in advance by the terminal device and the network device through beamforming.

10. The signal transmission method according to claim 1, wherein the first sending time point comprises one or more sending time points of the plurality of sending time points.

11. The signal transmission method according to claim 1, wherein the second sending time point comprises one or more sending time points among the plurality of sending time points, and the second start time point comprises one or more start time points among the plurality of start time points.

12. A terminal device, comprising:

a processor, configured to determine at least one start time point for entering an activated state of radio resource control (RRC) active discontinuous reception (DRX) and determine a plurality of sending time points according to a transmission period of a first signal sent by a network device; and a transceiver, configured to receive, in response to determining that a first sending time point in the plurality of sending time points is different from each of the at least one start time point, the first signal at the at least one start time point additionally sent by the network device regardless of the transmission period, and receive, in response to determining that a second sending time point in the plurality of sending time points is same as a second start time point among the at least one start time point, the first signal at the second sending time point according to the transmission period of the first signal, the first signal being used by the terminal device to determine, from at least one downlink receiving beam, a target downlink receiving beam for receiving and decoding a downlink control channel sent by the network device.

13. The terminal device according to claim 12, wherein the processor is further configured to, prior to determining the at least one start time point for entering the activated state of RRC active DRX, determine a period of DRX cycle, the period of DRX cycle comprising a duration of the activated state and a duration of an inactivated state; and determine a plurality of start time points according to the period of DRX cycle.

14. The terminal device according to claim 12, wherein a period of DRX cycle is an integer multiple of a transmission period of the first signal, and the period of DRX cycle comprises a duration of the activated state and of an inactivated state.

15. The terminal device according to claim 12, wherein the processor is configured to receive third indication information sent by the network device, the third indication information being indicative of a first start time point in the at least one start time point.

16. The terminal device according to claim 12, wherein the first signal comprises a downlink reference signal or a downlink synchronization signal.

17. A non-transitory computer readable medium, configured to store a computer program, wherein the computer program comprises instructions for implementing a signal transmission method, the method comprising:

determining at least one start time point for entering an activated state of radio resource control (RRC) active discontinuous reception (DRX);

determining a plurality of sending time points according to a transmission period of a first signal sent by a network device;

receiving, in response to determining that a first sending time point in the plurality of sending time points is different from each of the at least one start time point, the first signal at the at least one start time point additionally sent by the network device regardless of the transmission period; and receiving, in response to determining that a second sending time point in the plurality of sending time points is same as a second start time point among the at least one start time point, the first signal at the second sending time point according to the transmission period of the first signal, the first signal being used by a terminal device to determine, from at least one downlink receiving beam, a target downlink receiving beam for receiving and decoding a downlink control channel sent by the network device.

\* \* \* \* \*